Patented Dec. 15, 1953

2,662,869

UNITED STATES PATENT OFFICE 2,662,869

VULCANIZED COMPOSITION FORMED FROM SULFUR, RUBBER, AND AN ALKENYL PHENOL FOR JOINING METAL, WOOD, GLASS, AND THERMOSETTING RESINS

Herman S. Bloch, Chicago, Ill., assignor to Universal Oil Products Company, Chicago, Ill., a corporation of Delaware No Drawing. Application August 2, 1951, Serial No. 240,034

6 Claims. (Cl. 260—45.5)

This application is a continuation-in-part of my copending application Serial Number 673,482 filed May 31, 1946, now abandoned.

This invention relates to a bonding composition suitable for joining metal, wood, glass, and a thermosetting resin to each other or for joining pieces of one of these materials.

An object of this invention is to form a vulcanizable bonding composition by interacting unsaturated compounds and aromatic compounds.

Another object of this invention is to form a bonding composition by vulcanizing a mixture comprising a copolymer of butadiene and styrene and a resinous material formed by interacting butadiene and a phenol in the presence of an acid catalyst.

One embodiment of this invention relates to a bonding composition formed by vulcanizing a composite of sulfur, an unsaturated elastomer selected from the group consisting of natural rubber and a rubbery copolymer of butadiene and styrene, and a condensation product formed by interacting a conjugated diolefin and a phenol in the presence of an acid catalyst.

Another embodiment of this invention relates to a bonding composition formed by vulcanizing a composite of sulfur, a rubbery butadiene-styrene copolymer, and an alkenyl phenol, said alkenyl phenol being formed by condensing a phenol and a conjugated diolefin in the presence of an acid catalyst.

A further embodiment of this invention relates to a bonding composition formed by vulcanizing a composite of sulfur, a rubbery butadiene-styrene copolymer, and a resinous product formed by condensing a phenol and a conjugated diolefin in the presence of a phosphoric acid catalyst.

A still further embodiment of this invention relates to a bonding composition formed by vulcanizing a composite of sulfur, a butenyl phenol, and a rubbery butadiene-styrene copolymer.

A bonding composition suitable for joining concrete, stone, wood, metals, etc., with glass, tile, thermosetting resins, plastics, etc., comprises a vulcanizable material made by reacting a polyenic material such as a dienic or polyenic hydrocarbon or derivative thereof, such as butadiene, isoprene, chloroprene, piperylene, cyclopentadiene, etc., and a substituted aromatic compound selected from the class consisting of a phenol and aniline, a halogenated aromatic hydrocarbon and a thiophenol. These reaction products include such materials as (a) alkenyl phenols or ring-substituted alkenyl phenols, for example, butenyl phenol or tertiary-butyl butenyl phenol; (b) alkenyl anilines, for example, butenyl aniline; (c) alkenyl thiophenols, or (d) alkenyl haloaromatics, for example, butenyl-mono-chlorobenzenes.

These materials may be represented by the formula $ArR_nH_mX_p$, where Ar is an aryl nucleus, R is an alkenyl substituent, n is 1 or 2, m is an integer at least equal to 3, p is 1 or 2, but the sum of n plus p does not exceed 3, and the X groups are separately chosen from the group comprising the halogen, hydroxy, amino, and thiol radicals.

The reaction products include also the condensation products of the materials (a), (b), (c) and (d) with aldehydes or ketones, for example, with formaldehyde; the products produced by the polymerization of the materials, (a), (b), (c), and (d); and the high-molecular polymeric and condensation products formed as a resinous bottoms by-product in the preparation of the materials (a), (b), (c), and (d).

The preparation of successful bonding materials applicable to the bonding of the materials of widely dissimilar characteristics, discussed above, involves consideration of the following principles: (1) the bonding agent should be capable of setting at a relatively low temperature, so as not to destroy materials which, like wood, are relatively heat-unstable; (2) the agent should contain ingredients capable of establishing firm bonds with polar materials such as wood or glass; (3) it should contain ingredients capable of establishing firm bonds with metals; (4) ingredient (2) should be the same as that of (3) or be capable of forming a stable compound with it.

Alkenyl phenols and other related condensation products of a phenol and a conjugated diolefin which may be used as a starting material in this process may be obtained by reacting one molecular proportion of a conjugated diolefin with from about 0.25 to about 5 molecular proportions of a phenol in the presence of an acid catalyst at condensation conditions. Suitable acid catalysts include a phosphoric acid, a composite of a phosphoric acid and an ether, a composite of a phosphoric acid and a siliceous adsorbent precalcined at a temperature of from about 250° to about 600° C., an acid-acting metal phosphate, and the like. The phosphoric acid containing catalysts are so employed at a temperature of from about 25° to about 300° C. and at a pressure of from substantially atmospheric to 150 atmospheres or more.

Condensation of a conjugated diolefin with a phenol may be carried out by mixing a diolefinic hydrocarbon with an excess of the phenol and then passing the resultant mixture or solution in the presence or absence of a non-polar diluent, such as a paraffinic hydrocarbon or naphthenic hydrocarbon, through a suitable tower or reactor containing formed particles of a solid phosphoric acid catalyst or acid phosphate catalyst maintained at a temperature of from about 25° to about 300° C. and preferably at a temperature of from about 75° to about 250° C. The reaction is also carried out at a pressure from substantially atmospheric to about 150 atmospheres or more, the pressure generally being sufficient to maintain a substantial proportion of the reactants in liquid phase.

The step of condensing a phenol with a diolefin may also be carried out in a batch type operation by adding the diolefin continuously to a stirred mixture of the phenol and a liquid catalyst, such as orthophosphoric acid or a complex of a concentrated phosphoric acid and an ether, such as a complex of 100% orthophosphoric acid and substantially anhydrous diethyl ether.

The products so formed by reacting a conjugated diolefin and a phenol in the presence of a phosphoric acid catalyst are separated into a catalyst layer and an organic product layer, the latter being then separated into unconverted phenol and reaction products. The reaction products may be fractionally distilled to separate lower boiling products from higher boiling residue or they may be subjected to extraction with a caustic soda solution in order to dissolve phenolic materials in the caustic soda solution and thereby separate phenolic reaction products from certain substantially neutral condensation products, such as ethers, resins, etc. The condensation reaction product which is soluble in caustic soda solution is then recovered as an oily layer by neutralizing the caustic soda solution with an acid or by reacting the caustic soda solution with carbon dioxide so as to liberate dissolved phenols such as the alkenyl phenols together with some unconverted phenolic starting material. The mixture of phenols and alkenyl phenols so obtained is then subjected to fractional distillation in order to separate unconverted starting material, monoalkenyl phenols such as butenyl phenols or pentenyl phenols, and higher boiling condensation products.

In the case of bonding compositions formed by vulcanizing composites containing butenyl phenols or the resinous residues formed in the preparation of butenyl phenols by the alkylation of phenol with butadiene in the presence of phosphoric acid, the presence of residual unsaturation permits vulcanization of the material with sulfur at temperatures of from about 125° to about 200° C. This vulcanization treatment is carried out for a time of from about 0.5 to about 10 hours. The phenol groups are capable of firm attachment to polar materials—for example, by hydrogen bonding with the oxygen of the hydroxy groups of cellulosic materials or with the oxygen in glass. The unsaturated linkages are capable of forming firm bonds with metals probably by way of the sulfur used in vulcanization. Finally, if the butenyl phenol derivative or other alkenyl phenol derivative is used alone, condition (4) above is met, or if it is used in conjunction with some other vulcanizable material, for example, rubber, which bonds to metals via sulfur, the butenyl phenol compounds are capable of linking with the rubber by copolymerization, by covulcanization, or by the formation of chroman rings.

The alkenyl phenols, alkenyl thiophenols, alkenyl anilines, or alkenyl haloaromatics, or their aldehyde condensation products, polmers, or their aldehyde condensation products, with sulfur and the conventionally used accelerators and other additives such as carbon black, zinc oxide, and the like, may be used with or without vulcanizable elastomeric material containing double bonds, such as a natural or synthetic rubber, for example, butadiene-styrene copolymer, to form a heat-curable all-purpose bonding agent. Since, in the milling of these materials with rubber, the material may stick to the rolls, it may be desirable also to incorporate additional plasticizers or solvents in such compositions. If natural or synthetic rubber comprises part of the bonding, the diene-phenol condensation product (or an analogue thereof, as described above) may be used in an amount comprising from about 5 to about 50% of the bonding composition; generally from about 10% to about 25% is most satisfactory.

The following examples are given to illustrate the type of bonding composition referred to above, although the data present are not included with the intention of restricting unduly the broad scope of the invention.

EXAMPLE I 323 grams (6 mols) butadiene was bubbled at atmospheric pressure through 1606 grams (17 mols) phenol in the presence of 266 cc. of 100% liquid phosphoric acid at 115° C. under total reflux for a time of three hours. The butadiene was completely absorbed. Upon completion of the reaction and after the elimination of the phosphoric acid, the resultant product was subjected to a fractional vacuum distillation to give the following results:

|  | B. P. (° C.) at 760 mm. | Grams | Percent |
| --- | --- | --- | --- |
| Unreacted phenol | 189–192 | 676 | 35.0 |
| Mixture of unreacted phenol and butenylphenol | 192–200 | 319 | 16.5 |
| Butenylphenol fraction | 200–281 | 304 | 15.8 |
| Resinous bottoms | Over 281 | 535 | 27.8 |
| Unaccounted loss |  | 95 | 4.9 |

The butenyl phenol fraction was colorless and had a pleasant odor. The residue was a hard, brittle dark brown-red mass.

100 parts by weight of a rubbery butadiene-styrene copolymer (GR–S), 50 parts by weight of carbon black (Kosmobile–77), 20 parts by weight of the resinous bottoms formed from butadiene and phenol and boiling above 281° C., 5 parts by weight of zinc oxide, 3 parts by weight of sulfur, and 1.5 parts by weight of 2-mercaptobenzothiazole were mixed on a rubber mill to form a homogeneous rubber-like mass. The resin incorporated in this milled material was a dark brittle substance obtained as the distillation residue in the experiment described above.

The material mixed on the rubber mill as above indicated was then vulcanized between two overlapping pieces of soft steel (0.8 mm. thick) at a temperature of 140° C. and under a pressure of 1000 p. s. i. for 50 minutes. The vulcanized material formed a firm bond to the steel, thus firmly bonding together the two steel strips used in the test.

EXAMPLE II

A phosphoric acid-ether complex was formed by adding anhydrous ether through a dropping funnel at room temperature to 85% orthophosphoric acid contained in a 5 liter round bottom glass vessel equipped with a 1-liter dropping funnel, a mercury sealed stirrer, thermometer, a reflux condenser cooled by solid carbon dioxide and on the outlet of which was a calcium chloride drying tube. The phenol was then added and the flask and contents cooled to around 20° C. Isoprene, which had previously been redistilled, was then added through the dropping funnel over a one-half hour period while keeping the temperature at about 25° C. by cooling with ice. The product was then stirred for an additional 1.5 hours while maintaining a temperature of 25° C. After a short settling time the lower acid layer was separated, the upper product layer transferred to a 2 gal. glass bottle and washed twice with 1000 cc. of distilled water, once with 1000 cc. of 5% NaHCO3 solution and then twice with 1000 cc. of distilled water.

The accumulated product from three runs was then distilled through an 8 foot jacket heated glass column having a 2 inch inside diameter and packed with 0.25 inch glass helices. After bringing overhead the ether and water at atmospheric pressure, the unreacted phenol and higher boiling product were distilled at a reduced pressure of about 4 mm.

Selected fractions, as determined by $n_D^{20}$ measurements were then treated in a 5 gal. glass bottle with 1¼ times the theoretically required amount of 20% NaOH solution and the solution diluted with about twice its volume of distilled water and extracted twice with n-pentane. The pentane extract was treated with a small amount of 20% NaOH solution which was then diluted with water, separated and added to the main bulk of caustic solution. The pentane extract was then dried with anhydrous Na2SO4 and the pentane distilled off to recover neutral compounds.

The caustic solution was acidified with solid CO2, n-pentane added and the upper layer separated. The water was again extracted with n-pentane, the two pentane extracts combined, water washed, dried over anhydrous Na2SO4 and the pentane distilled off to recover the caustic soluble pentenyl phenols. The combined products were then distilled through the 8 foot fractionating column mentioned above to recover pure pentenyl phenol. In these runs 64% of the phenol was recovered unchanged while the pentenyl phenol fraction amounted to 38.4% of the isoprene charged.

This pentenyl phenol fraction was employed in the following formulation, which was milled as described in Example I:

| | Parts |
|---|---|
| GR–S | 100 |
| Kosmobile–77 | 50 |
| Pentenyl phenol | 20 |
| Sulfur | 4 |
| Zinc oxide | 5 |
| 2-Mercaptobenzothiazole | 1.5 |

The milled composite formed an excellent bond between sheet aluminum and steel plate when a "sandwich" of the bonding agent was vulcanized between the two metals for 1 hour at 140° C. and 750 p. s. i. pressure.

I claim as my invention:

1. A bonding composition comprising sulfur, an unsaturated elastomer selected from the group consisting of natural rubber and a rubbery copolymer of butadiene and styrene, and a condensation product of phenol with a conjugated diolefin hydrocarbon selected from the group consisting of butadiene and isoprene.

2. A bonding composition comprising sulfur, an unsaturated elastomer selected from the group consisting of natural rubber and a rubbery copolymer of butadiene and styrene, and an alkenyl phenol condensation product of phenol with a conjugated diolefin hydrocarbon selected from the group consisting of butadiene and isoprene.

3. A bonding composition comprising sulfur, an unsaturated elastomer selected from the group consisting of natural rubber and a rubbery copolymer of butadiene and styrene, and a resinous condensation product of phenol with a conjugated diolefin hydrocarbon selected from the group consisting of butadiene and isoprene.

4. A bonding composition comprising sulfur, a rubbery copolymer of butadiene and styrene, and a condensation product of from about 0.25 to about 5 molecular proportions of phenol with 1 molecular proportion of a conjugated diolefin hydrocarbon selected from the group consisting of butadiene and isoprene.

5. The composition of claim 4 further characterized in that said condensation product is an alkenyl phenol.

6. The composition of claim 4 further characterized in that said condensation product is a resin.

HERMAN S. BLOCH.

References Cited in the file of this patent

UNITED STATES PATENTS

| Number | Name | Date |
|---|---|---|
| 1,819,416 | Harvey | Aug. 18, 1931 |
| 2,296,363 | Messer | Sept. 22, 1942 |
| 2,320,746 | Paul | June 1, 1943 |
| 2,337,464 | Hecht | Dec. 21, 1943 |
| 2,353,282 | Turkington | July 11, 1944 |